United States Patent
Etelapera (10) Patent No.: US 7,685,238 B2
(45) Date of Patent: Mar. 23, 2010

(54) PRIVACY PROTECTION ON APPLICATION SHARING AND DATA PROJECTOR CONNECTIVITY

(75) Inventor: Esa Etelapera, Tampere (FI)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 11/302,452

(22) Filed: Dec. 12, 2005

(65) Prior Publication Data

US 2007/0136466 A1 Jun. 14, 2007

(51) Int. Cl.
G06F 15/16 (2006.01)

(52) U.S. Cl. ...................................... 709/205

(58) Field of Classification Search ................. 709/205, 709/206, 207, 229
See application file for complete search history.

(56) References Cited

U.S. PATENT DOCUMENTS

| | | | | |
|---|---|---|---|---|
| 6,092,197 | A * | 7/2000 | Coueignoux | 726/21 |
| 6,256,664 | B1 * | 7/2001 | Donoho et al. | 709/204 |
| 6,263,362 | B1 * | 7/2001 | Donoho et al. | 709/207 |
| 6,618,721 | B1 * | 9/2003 | Lee | 707/3 |
| 6,714,977 | B1 * | 3/2004 | Fowler et al. | 709/224 |
| 6,871,277 | B1 * | 3/2005 | Keronen | 713/167 |
| 7,076,652 | B2 * | 7/2006 | Ginter et al. | 713/153 |
| 7,124,302 | B2 * | 10/2006 | Ginter et al. | 713/189 |
| 7,346,655 | B2 * | 3/2008 | Donoho et al. | 709/204 |
| 7,360,202 | B1 * | 4/2008 | Seshadri et al. | 717/106 |
| 2001/0029468 | A1 * | 10/2001 | Yamaguchi et al. | 705/14 |
| 2002/0071394 | A1 * | 6/2002 | Koziy et al. | 370/248 |
| 2003/0200127 | A1 * | 10/2003 | McQueen et al. | 705/7 |
| 2005/0036509 | A1 | 2/2005 | Acharya et al. | 370/466 |
| 2005/0261020 | A1 * | 11/2005 | Kumar | 455/550.1 |
| 2005/0262083 | A1 * | 11/2005 | Brown | 707/9 |
| 2006/0123339 | A1 * | 6/2006 | DiMichele et al. | 715/700 |
| 2009/0037821 | A1 * | 2/2009 | O'Neal et al. | 715/732 |

* cited by examiner

Primary Examiner—Wing F Chan
Assistant Examiner—Tesfay Yohannes (57) ABSTRACT

Privacy protection of data content is provided by identifying one or more applications running on a suitably configured device, and marking each of the applications to indicate that a respective one of the applications is permitted or not permitted to issue messages in an all share public mode. The data content of such messages is hidden from public view in response to the application not having the requisite permission to issue messages in the all share public mode. A computer program and mobile terminal device for providing privacy protection of data content are also presented.

17 Claims, 6 Drawing Sheets

PRIVACY PROTECTION ON APPLICATION SHARING AND DATA PROJECTOR CONNECTIVITY

TECHNICAL FIELD

The present invention relates generally to application sharing, particularly to the data content presentation to an audience in a share all applications mode in which the participants see on their respective device screens the data content that is shown on the presenter's device screen. More specifically, the invention relates to the protection of private user interface notification messages from shared applications during the application sharing of such data content presentation to the audience participants for example on their respective device screens or by means of a suitable data projection.

BACKGROUND OF THE INVENTION

It is known in the prior art to present or project data or other information onto a large screen or large-screen viewing device for public viewing by an audience. Such systems may for example, have a PC or mobile device such as a communicator connected to a projection device, viewing monitor or other suitable display means for showing the data or information. A typical public showing to an audience might be the display of a set of slides by a presenter from a slideshow running on the presenter's PC or mobile device wired to the projector or viewing device. One major drawback is the audience would see any and all information viewable to the presenter including any notes that the presenter might wish to view for use during the presentation. Accordingly, the prior art does not provide a way for the presenter to display only the "public" portion of the presentation.

It is also known in the prior art to have application sharing in a share all applications mode, such as in an online meeting in which the participants see on their respective device screens the data content that is shown on the presenter's device screen. Generally, the capability to share the data content with others is a selectable option a suitably configured device, i.e., the device has the capability to operate in an application sharing or an application non-sharing mode in which the data content shown on one device screen is shown or not shown on other device screens.

A further problem arises during the showing of public information to an audience when an application running on the presenter's PC or mobile device triggers a notification communication intended for the presenter only, such as a reminder, an alert, instant messenger communication or other such personal notification well known to the consuming public and those skilled in the art. These notification communications are shown on the presenter's PC mobile device screen and are also shown to the audience along with the public information of the presentation although such notification communications are intended to be private and not revealed to the audience.

It would be desirable therefore to provide a way for the presenter to display only the "public" portion of a presentation and avoid showing private data or information or notification communications when the presentation device operates in an all share public mode.

It would also be desirable to provide a way to automatically avoid showing private data or information when the presentation device is in an "application sharing" mode.

Accordingly, it is an object of the present invention to enable automatic hiding of notification communications or personal details of the notification data content when the user interface of a PC or mobile device is publicly presented using application sharing, a data projector or other methods which enable viewing of the user interface content.

SUMMARY OF THE INVENTION

In accordance with a first broad aspect of the invention, privacy protection of data content is provided by identifying one or more applications running on a suitably configured device, and marking each of the applications to indicate that a respective one of the applications is permitted or not permitted to issue messages in an all share public mode. The data content of such messages is hidden from public view in response to the application not having the requisite permission to issue messages in the all share public mode. The marking of the applications may be accomplished by creating a first listing of the applications marked with permission to issue messages when the device is in an all share public mode and a second listing of the applications marked as not having permission to issue messages when the device is in an all share public mode. The application wishing to display data content is compared with the listed applications in response to detecting that the all share mode in the device is activated whereby the data content is shown in response to determining that the application is in the list of applications marked with permission to issue messages, and not showing the data content in response to determining that the application is in the list of applications not having permission to issue messages. Personal information may be removed from the messages prior to issuing the message.

The application may determine that the all share mode in the device is activated and if so, determine prior to interrupting to display a message whether the application is permitted or not permitted to show the message. The message is hid in response to determining the application is not permitted to show the message or the message may be displayed only on the display screen of the device.

The applications may be any of but not limited to a notification application, an instant messaging application, an alarm alert application, a calendar application, or other such applications well known to those skilled in the art.

An inquiry sequence may be provided in the application for determining when the device is in an all share public mode and for determining if the application is permitted to issue messages in response to the device being in an all share public mode. The message data content is displayed on the device display screen and on an external viewing device in communication with the device in response to determining the application is permitted to issue messages. The messages may take the form of displaying an icon or a text message or providing an audible message.

In a further broad aspect of the invention, a computer program product carried on a storage medium and executable by a processor in a presentation device provides privacy protection of application data content in an application sharing device by identifying applications running on a suitably configured device and suitably marking the permission status of each of the identified applications to issue or not issue messages when the device is in an all share public mode; whereby the application data content is hidden from public view thereby providing privacy protection of the application data content.

In a yet further broad aspect of the invention, a mobile terminal device for carrying out the privacy protection of application data content in an all share public mode is presented.

BRIEF DESCRIPTION OF THE DRAWINGS

Other objects, features and advantages of the present invention will become readily apparent from the written description taken in conjunction with the drawings in which like reference numbers refer to like parts wherein.

WRITTEN DESCRIPTION OF PREFERRED EMBODIMENTS

Figure 1:
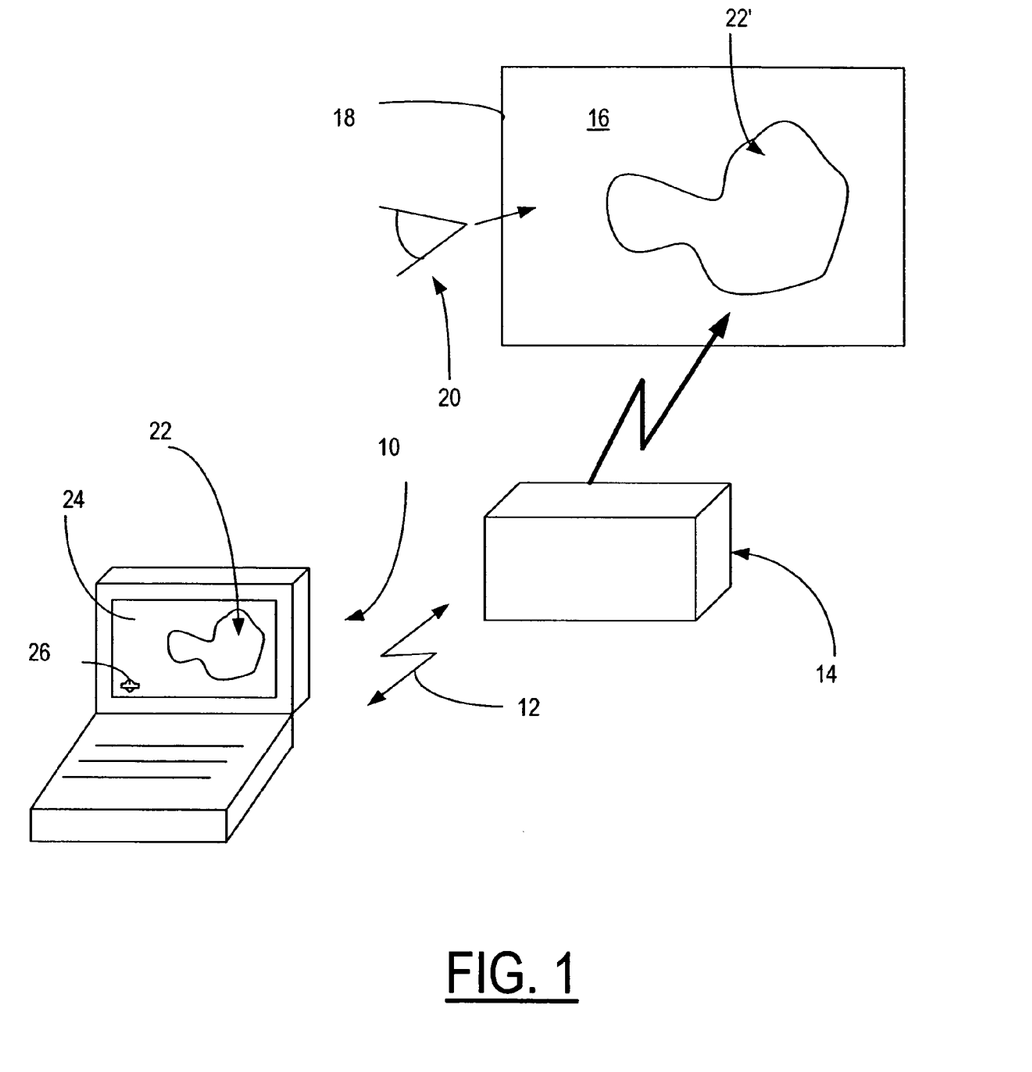
FIG. 1 is a functional schematic representation of a system embodying the present invention.

Turning now to the drawings and considering the invention in further detail, a function schematic representation of a system embodying the invention for providing privacy protection of notification application data content in an application sharing environment is shown therein. As illustrated in FIG. 1, a presentation device generally designated 10 is arranged and configured to run various application programs including presentation programs. Examples of such presentation programs are video slideshows and other presentation programs well known to those skilled in the art and to the general consuming public. In FIG. 1, the presentation device 10 is arranged using any suitable connection technology or means 12 to carryout the intended function to connect to a suitable external viewing device such as for example, a projector or other projection or viewing device 14 configured to carry out the intended function. The presentation device 10 and projector 14 may be arranged to use any suitable technology to establish the wireless connection 12 such as Bluetooth, or may be wired, infrared and others well known to those skilled in the art.

The projector and projection device 14 operates in a well known manner to project or show an image, text, graphics or other graphical or video information onto a receiving viewing surface 16 typically onto a projection screen 18 or other suitable surface for public viewing for example, represented by a viewer 20.

The presentation device 10 may be any suitable device capable of running an application program and may be for example, a laptop or notebook computer, a PC, a mobile device, a communicator, a PDA or other suitable device configured to carry out the intended function. Such devices are well known to those skilled in the art.

In the illustrated example in FIG. 1, an image generally designated 22 is shown on the display screen 24 of the presentation device 10. The image may be that contained in a slide of a presentation program or may be any other image, text or graphic shown on the display screen 24. As the image 22 is shown on the display screen 24, the presentation data content of the image is also transmitted to the projector 14 which in turn projects the image 22' onto the receiving surface 16 of the screen 18 for observation by the viewer 20. A notification message may be issued during the presentation and brought to the attention of the presenter by means of an icon 26 shown on the screen 24 indicating to the presenter that a message, alert or other notification communication is present. Such notification applications include calendar, alarm alerting to the presence of an email or other communication, instant messaging, or other similar notification issue messages well known to those skilled in the art and to the general public. However, the presenter may not wish to project the icon 26 onto the receiving surface 16 of the screen 18 and thereby keep the issuance of the notification message hidden from the audience.

Figure 2:
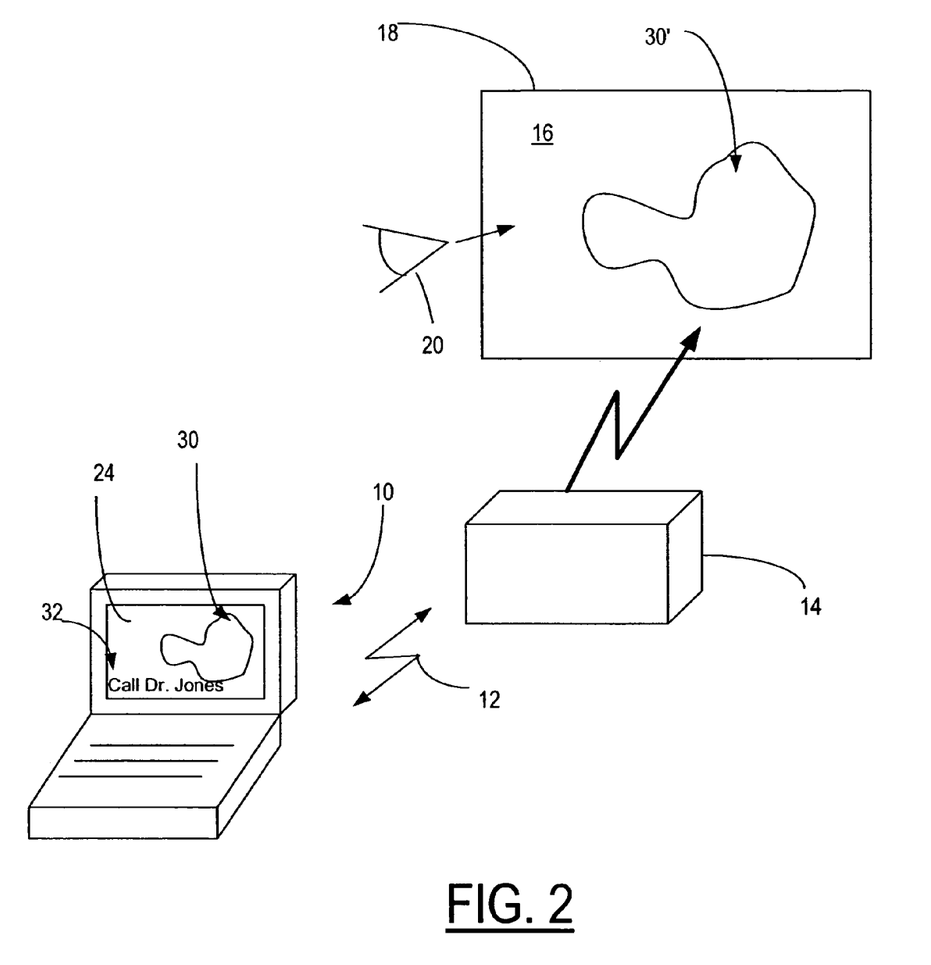
FIG. 2 is a schematic representation of a display shown on the screen of the presentation device and the corresponding public view display with the notification message data content hidden from view.

Turning now to FIG. 2, an example of the privacy protection of notification data content embodying the present invention is illustrated therein wherein the presentation device 10 is running a presentation application in which an image 30 is shown on the display screen 24 and projected by means of the projector 14 onto the receiving surface 16 of the screen 18 for viewing by an audience as image 30'. Now during the presentation, a notification application also running on the presentation device 10, such as an instant messaging application, issues a notification in the form of a notification text message "call doctor Jones" generally designated 32 and is shown on the display screen 24 of the presentation device 10. In accordance with the present invention, the notification application has been marked as not having permission to issue a notification message when the presentation device 10 is in an all share public mode and therefore, the instant messaging message 32 is not shown at all, not even on the display screen 24 because the projection device 14 shows exactly the same content, pixel-by-pixel of what is shown on the display screen 24. Therefore the notification application data content is hidden from the public view and its privacy is maintained.

In a further embodiment of the invention, the notification application is configured to modify the content of the notification when the presentation device 10 is in an all share public mode so tat the notification message does not contain any "personal" information. For example, in an instant messaging notification in which the original message shows "Mom>: pick-up laundry", the notification message would be modified to show "instant message received" or "instant message from Mom". The personal information portion is not shown and therefore the privacy of information is protracted in an all application sharing mode.

Figure 3:
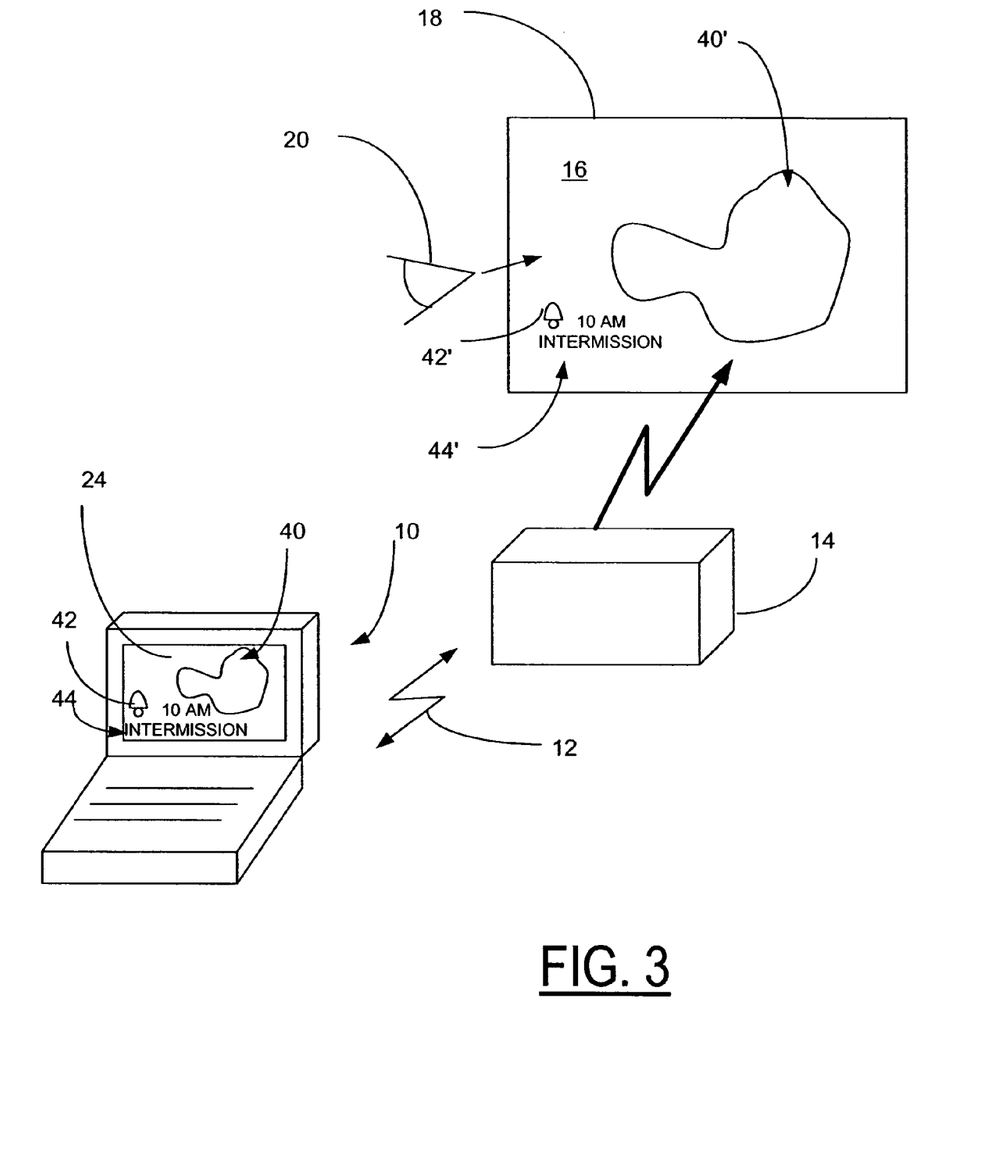
FIG. 3 is a schematic representation of a display shown on the screen of the presentation device and the corresponding public view display including the display of the notification message data content.

Turning now to FIG. 3, a further example for providing privacy protection of notification data content in accordance with the present invention is illustrated therein wherein a presentation device 10 is running a presentation application in which an image 40 is shown on the display screen 24 of the presentation device 10 and communicated to a external viewer or projection device 14 for showing on the receiving surface 16 of the screen 18. The projected image 40' is shown for public viewing by an audience 20. In this example, a notification application such as a timer or "alarm clock" application issues a notification message in the form of a ringing bell icon 42 and text message "10 a.m. intermission" generally designated 44. In this example, the notification application is marked to indicate that it has permission to issue notifications when the presentation device 10 is in an all share public mode and accordingly, the icon 42' and text message 44' corresponding to the icon 42 and text message 44 shown on the presentation device screen 24 are projected onto the receiving surface 16 of the screen 18 for viewing by the audience 20. In this example, the presenter wishes to allow the audience to view the notification message data content.

Figure 4:
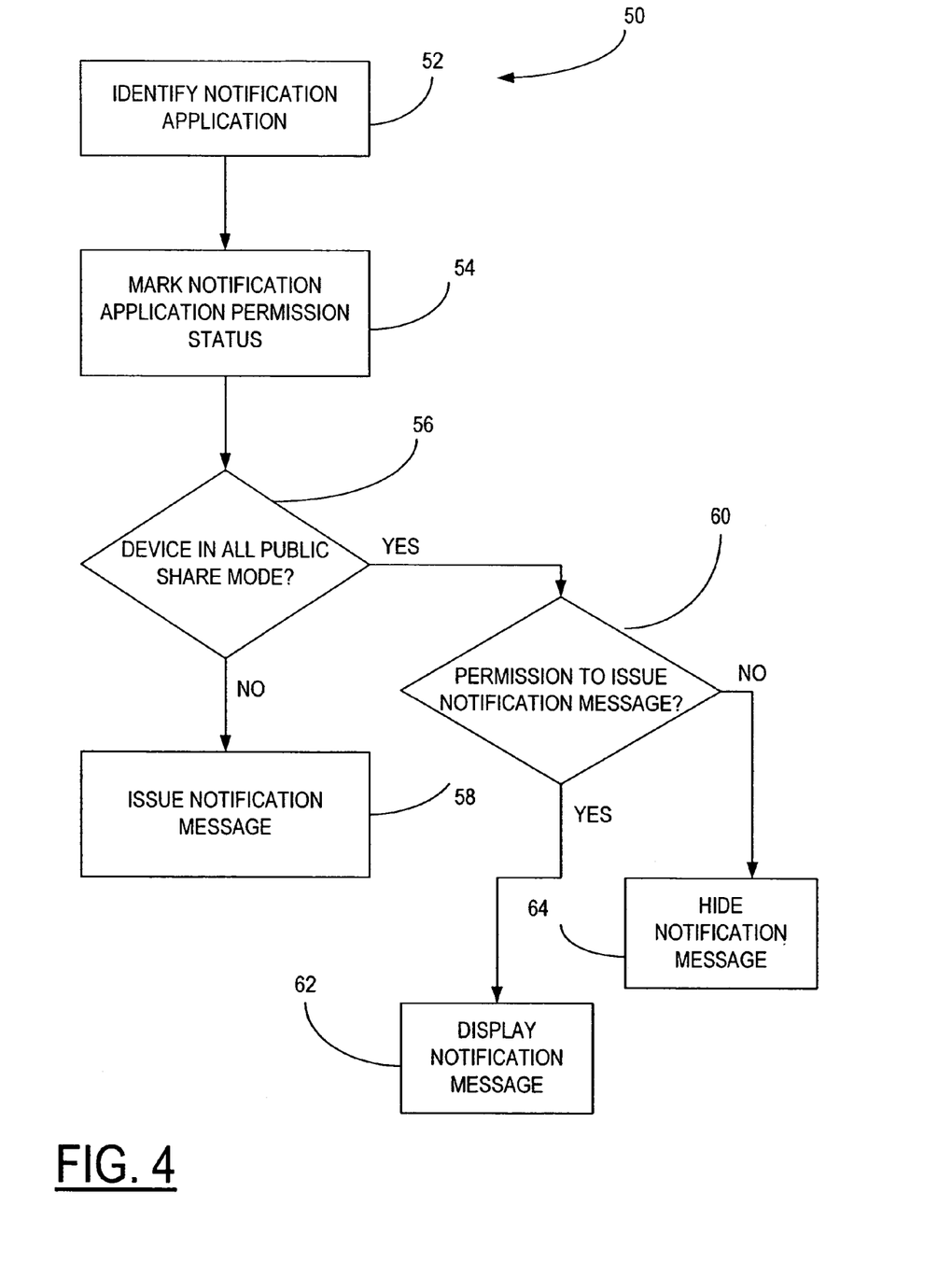
FIG. 4 is a flowchart in accordance with an embodiment of the invention.

Turning now to FIG. 4, a flowchart showing one embodiment of the privacy protection of notification data content embodying the present invention is illustrated therein and generally designated 50. The method begins by identifying in step 52 the notification applications running on the presentation device. The system moves to step 54 wherein the notification applications are marked in some manner to indicate its respective permission status to issue notifications. The method determines in step 56 if the presentation device is in an all share public mode. If it is determined that the presentation device is in an all share public mode, the notification application issues the appropriate notification message in step 58. If it is determined in step 56 that the presentation device is in an all share public mode, the system then determines in step 60 if the notification application is permitted to issue a notification message when the presentation device is in an all share public mode. If it is determined in step 60 that the notification application is permitted to issue a notification message, the notification message is displayed in step 62 on the presentation device user interface or screen and on the external viewer or projector for public viewing. If it is determined in step 60 that the notification application is not permitted to issue notification messages, then the system moves to step 64 and hides the notification message data content from being displayed on the external viewer thereby providing privacy of the notification application data content.

It is contemplated that the presenter utilizing the presentation device embodying the present invention indicate prior to running the presentation application and showing to the audience, mark whether or not the respective notification application is allowed to issue notification messages during the presentation session. The presenter may select the notification applications that he desires to prevent from issuing notification messages prior to starting the presentation and likewise selecting those notification applications if any that the presenter wishes to allow to issue notification messages during the presentaiton.

It is also contemplated that the notificiaton applications can be listed in a library of notification applications permitted to issue notification messages and a library of notification applications not having permission to issue notification messages when the presentation device is in an all share public mode such that during the operation of the presentation device, the notification application first executes an inquiry sequence to determine its permission status prior to issuing an interrupt and the notification message to the presentation device. If the notification application lacks permission, the notification message data content is automatically hidden from public viewing during the presentation session.

Figures 5, 6:
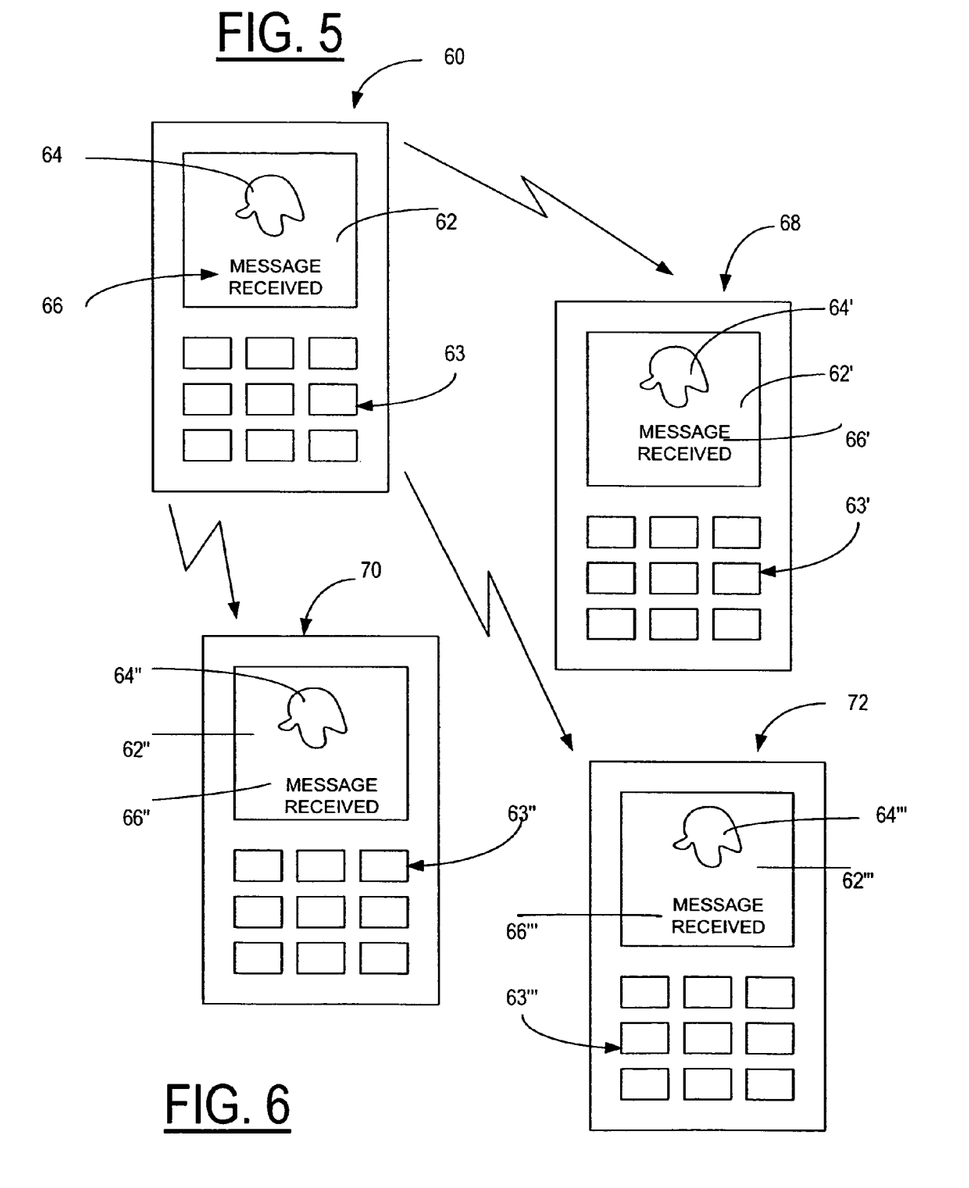
FIG. 5 shows an instant message with personal information.
FIG. 6 is a schematic representation of a number of mobile devices in a share all application mode showing the instant message of FIG. 5 modified in accordance with the present information.

Turning now to FIGS. 5 and 6, a further embodiment of the present invention is illustrated therein wherein in FIG. 5, an instant message including the personal information, "Mom: >pick-up laundry" is shown. In accordance with the present invention, the personal information is removed from the instant message and replaced with a substitute term to advise the presenter that an instant message is present. As shown in FIG. 6, a number of mobile terminal devices 60, 68, 70, 72 are operated in a share all application mode wherein the mobile terminal 60 communicates with the mobile terminals 68, 70, and 72. The mobile terminal 60 includes a screen 62 and a keypad 63 to provide input to the mobile terminal device 60. As illustrated, an image 64 shown on the screen 62 is presented pixel-by-pixel as an image 64', 64", 64''' on the screens 62', 62", 62''' of the respective mobile terminals 68, 70, 72.

Now in accordance with the present invention, the personal information of the instant message as illustrated in FIG. 5 is removed and is replaced with an appropriate term or phrase, for example as indicated on the screen 62 as a "message received" 66 to alert the presenter that an instant message has been sent. The notification "message received" 66 is shown on the screens 62', 62", 62''' as the text message "message received" 66', 66", 66''' on the respective mobile terminals 68, 70, 72. Thus the personal information is removed from the message and is hidden from public view thereby providing privacy protection of the application data content.

In some situations such as high priority notifications for example, the presenter may be awaiting notification of a delivery of a message of particular importance in which case the presenter wants to be notified of the actual content of the message received. In this instance, the presenter will therefore select an option to identify that the message containing personal information sent from a pre-identified sender may be shown wherein the data content contains personal information. Thus, the presenter in accordance with the present invention has the ability to filter messages, such as notification messages including instant messaging, alarms, alerts or other such notification applications, to deliver some messages with personal information and to modify other messages to remove the personal information.

Figure 7:
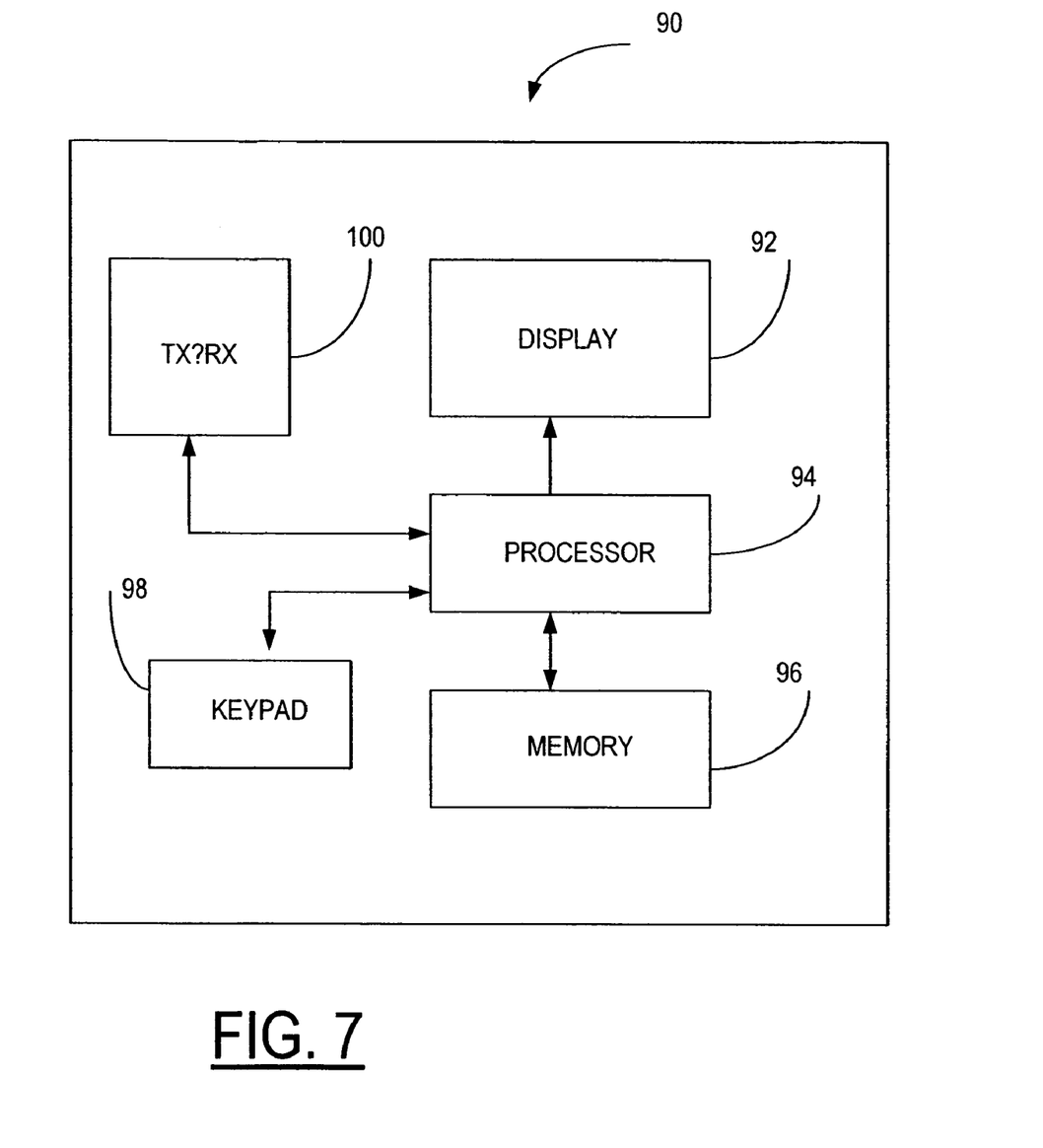
FIG. 7 is a schematic block diagram having the major functional components of a mobile terminal device embodying the invention.

Turning now to FIG. 7, a schematic functional block diagram of a mobile terminal device embodying the invention is illustrated therein and generally designated 90. The device 90 includes a display 92, a suitable processor or processing means 94, a memory 96 and a keypad 98. An instruction set for carrying out the intended operational steps of the mobile terminal device 90 is stored in the memory 96 in a conventional and well known manner. The program code embodying the present invention is stored in the memory 96 and is executable by the processor 94 for providing privacy protection of the application data content in accordance with the present invention. Messages, graphics or other indicia are shown on the display 92 in accordance with the specific functions being carried out. The keypad 98 is used in a well known manner to input text, dial numbers, and invoke the various functions and features of the mobile terminal device and of the applications running on the mobile terminal device. The mobile terminal device 90 also includes a transmit/receiver module 100 which operates in a well known manner and is controlled by the processor 94.

The present invention for providing privacy protection of notification data content has been shown above in several exemplary embodiments. It is to be understood that any suitable arrangement to carry out the function of the invention is contemplated and may be suitably implemented by those skilled in the art. Therefore the invention has been presented by way of illustration rather than limitation.

The invention claimed is:

1. Method, comprising:
running one or more application programs on a presentation device configured to run said application programs and configured to show data content of said one or more application programs on a display screen of said presentation device and on an external viewing device in communication connectivity with the presentation device when the presentation device is in an all share public mode operative state, at least one of said one or more application programs comprising a presentation application program and at least one of said one or more application programs comprising a notification application program;

identifying each of said one or more notification application programs;

marking each of said identified one or more notification application programs with an issue notification all share public mode permission status to indicate that a respective one of said one or more notification application programs is permitted or not permitted to issue messages when said presentation device is in an all share public mode operative state;

including an inquiry sequence in the notification application program to determine when the presentation device is in an all share public mode operative state;

determining if the notification application program is permitted to issue messages in response to the presentation device being in an all share public mode operative state, and displaying the message data content on the display screen of the presentation device and on the external viewing device in communication connectivity with the presentation device in response to determining the notification application program is permitted to issue messages.

2. The method as defined in claim 1 further comprising:

creating a first listing of said one or more identified notification application programs marked with permission to issue messages when the presentation device is in an all share public mode operative state;

creating a second listing of said one or more notification application programs marked as not having permission to issue messages when the device is in an all share public mode operative state;

operating the presentation device in an all share public mode;

detecting that the all share mode in the presentation device is activated;

comparing the identified notification application program wishing to display data content with the first listing and with the second listing of said one or more identified notification application programs;

showing the data content of the identified notification application program in response to determining that the identified notification application program is listed in said first listing of notification application programs marked with permission to issue messages, and not showing the data content of the identified notification application programs in response to determining that the identified notification application program is listed in said second listing of notification application programs not having permission to issue messages.

3. The method as defined in claim 2 further comprising:

determining prior to interrupting to display a message whether the notification application program is permitted or not permitted to show the message;

hiding the message in response to determining the notification application program is not permitted to show the message.

4. The method as defined in claim 3 further comprising displaying the message on the display screen of the presentation device only.

5. The method as defined in claim 1 wherein the message further comprises displaying an icon.

6. The method as defined in claim 1 wherein the message further comprises displaying a text message.

7. The method as defined in claim 1 wherein the message further includes providing an audible message.

8. The method as defined in claim 1 further comprising removing personal information from said messages prior to issuing the message.

9. The method as defined in claim 1 wherein said notification application program is an instant messaging application program.

10. The method of providing privacy protection as defined in claim 1 wherein said notification application program is an alarm alert application program.

11. The method as defined in claim 1 wherein said notification application program is a calendar application program.

12. A computer program product carried on a storage medium and executable by a processor in a presentation device comprising:

program code for running one or more application programs on a presentation device configured to run said application programs and configured to show data content of said one or more application programs on a display screen of said presentation device and on an external viewing device in communication connectivity with the presentation device when the presentation device is in an all share public mode operative state, at least one of said one or more application programs comprising a presentation application program and at least one of said one or more application programs comprising a notification application program;

program code for identifying each of said one or more notification application programs running on the presentation device;

program code for suitably marking each of the identified one or more notification application programs with an issue notification all share public mode permission status to indicate that a respective one of said one or more notification application programs is permitted or not permitted to issue messages when the presentation device is in an all share public mode operative state;

program code for including an inquiry sequence in the notification application program to determine when the presentation device is in an all share public mode operative state;

program code for determining if the notification application program is permitted to issue messages in response to the presentation device being in an all share public mode operative state, and program code for displaying the message data content on the display screen of the presentation device and on the external viewing device in communication connectivity with the presentation device in response to determining the notification application program is permitted to issue messages.

13. A mobile terminal device comprising:

a display screen;

a memory;

a processor suitably configured to carry out the operational functions of the mobile terminal device further comprising running one or more application programs on a presentation device configured to run said one or more application programs and configured to show data content of said application programs on a display screen of said presentation device and on an external viewing device in communication connectivity with the presentation device when the presentation device is in an all share public mode operative state, at least one of said one or more application programs comprising a presentation application program and at least one of said one or more application programs comprising a notification application program;

said processor further configured to identify each of said one or more notification application programs running on the mobile terminal device, and said processor further being configured to mark each of said identified one or more notification application programs with an issue notification all share public mode permission status to indicate that a respective one of said one or more notification application programs is permitted or not permitted to issue messages when said presentation device is in an all share public mode operative state;

said processor further being configured to carry out the steps of an inquiry sequence in the notification application program to determine when the presentation device is in an all share public mode operative state;

said processor further being configured to determine if the notification application program is permitted to issue messages in response to the presentation device being in an all share public mode operative state, and said processor further being configured to display the message data content on the display screen of the presentation device and on the external viewing device in communication connectivity with the presentation device in response to determining the notification application program is permitted to issue messages.

14. The method as defined in claim 1 further comprising issuing the message and hiding the information data content of the message.

15. The method as defined in claim 1 further comprising issuing the message and showing the information data content of the message on the display screen of the presentation device and not showing the information data content of the message on the external viewing device.

16. The method as defined in claim 1 further comprising issuing the message and showing the information data content of the message on the display screen of the presentation device and on the external viewing device.

17. The method as defined in claim 1 wherein the external viewing device further comprises a projection device.

* * * * *